United States Patent
Heinzelmann et al.

(10) Patent No.: US 8,713,803 B2
(45) Date of Patent: May 6, 2014

(54) BLADE ASSEMBLY OF A HEDGE TRIMMER

(75) Inventors: Georg Heinzelmann, Backnang (DE); Markus Hittmann, Weinstadt (DE)

(73) Assignee: Andreas Stihl AG & Co. KG, Waiblingen (DE)

(*) Notice: Subject to any disclaimer, the term of this patent is extended or adjusted under 35 U.S.C. 154(b) by 579 days.

(21) Appl. No.: 12/656,654

(22) Filed: Feb. 12, 2010

(65) Prior Publication Data
US 2010/0205811 A1 Aug. 19, 2010

(30) Foreign Application Priority Data
Feb. 13, 2009 (DE) .......................... 10 2009 008 819

(51) Int. Cl.
*B26B 19/10* (2006.01)

(52) U.S. Cl.
USPC .................. 30/216; 30/355; 30/208; 30/209; 30/210; 30/206; 30/351; 30/353; 30/224

(58) Field of Classification Search
USPC ........... 30/208–210, 216–220, 346, 351, 353, 30/355, 223, 224, 225
See application file for complete search history.

(56) References Cited

U.S. PATENT DOCUMENTS

| | | | | |
|---|---|---|---|---|
| 2,674,795 A | * | 4/1954 | Long ................................ | 30/216 |
| 3,193,925 A | * | 7/1965 | Hawley ............................ | 30/210 |
| 3,848,401 A | * | 11/1974 | Hast ................................ | 56/296 |
| 4,619,045 A | | 10/1986 | Mayer | |
| 5,093,999 A | * | 3/1992 | Raetz et al. ..................... | 30/392 |
| 5,412,873 A | * | 5/1995 | Gibson ........................... | 30/355 |
| 5,581,891 A | * | 12/1996 | Wheeler et al. ................. | 30/216 |
| 6,125,544 A | * | 10/2000 | Eriksson et al. ............. | 30/166.3 |
| 6,817,936 B1 | * | 11/2004 | Skeem et al. .................. | 451/547 |
| 7,290,641 B2 | * | 11/2007 | Lee ................................. | 188/20 |
| 2004/0187314 A1 | * | 9/2004 | Johnson .......................... | 30/162 |

FOREIGN PATENT DOCUMENTS

FR 2 758 234 7/1998

* cited by examiner

*Primary Examiner* — Katherine Mitchell
*Assistant Examiner* — Marcus Menezes
(74) *Attorney, Agent, or Firm* — Walter Ottesen P.A.

(57) ABSTRACT

A blade assembly of a hedge trimmer includes at least one cutting blade having cutting teeth. At least one portion of the cutting teeth are configured as protective teeth which, referred to the cutting blade axis, have an inner cutting region and from which an outer protective finger extends. The protective tooth is, referred to its tooth axis, configured unsymmetrically. The protective tooth has a cutting side and an opposite-lying holding side and a cutting edge in the cutting region on the cutting side and a holding edge on the holding side. The protective finger has a forward edge on the cutting side and a rearward edge on the holding side. Starting from the blade axis, the forward edge is inclined to the tooth axis and the rearward edge, starting from the blade axis, is inclined away from the tooth axis.

18 Claims, 2 Drawing Sheets

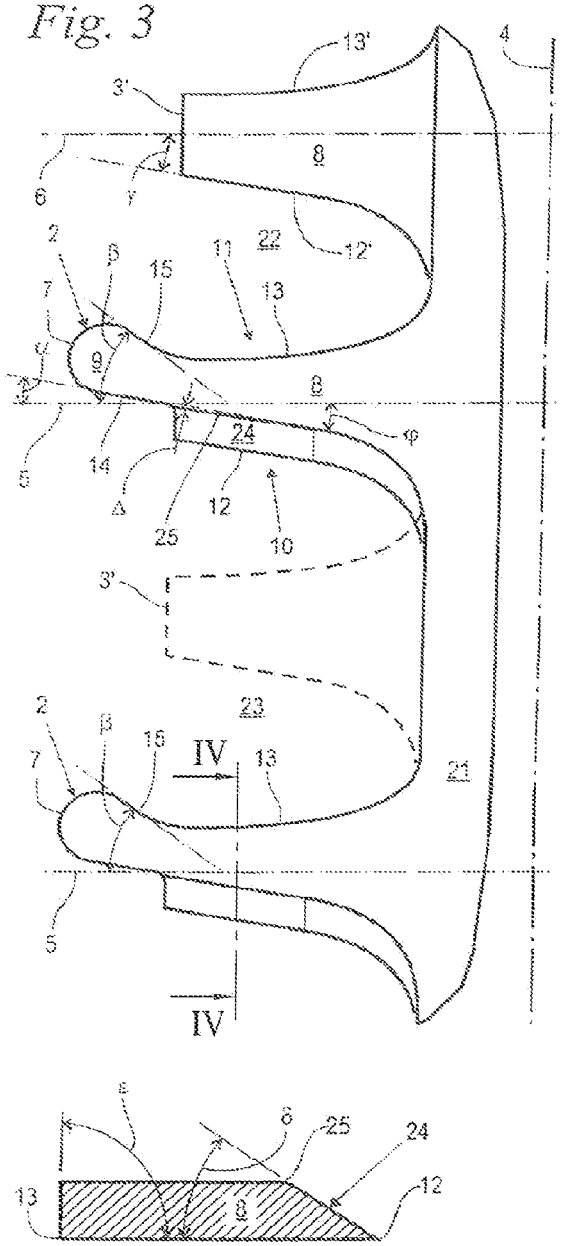
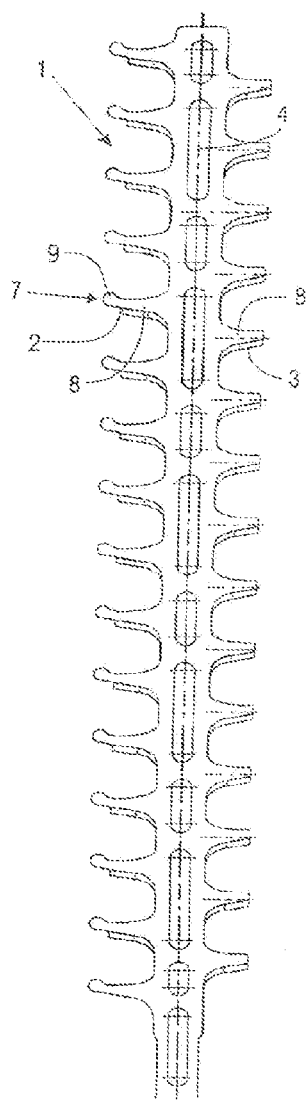

BLADE ASSEMBLY OF A HEDGE TRIMMER

CROSS REFERENCE TO RELATED APPLICATION

This application claims priority of German patent application no. 10 2009 008 819.9, filed Feb. 13, 2009, the entire content of which is incorporated herein by reference.

FIELD OF THE INVENTION

The invention relates to a blade assembly of a hedge trimmer.

BACKGROUND OF THE INVENTION

Motor-driven hedge trimmers are comprised of at least one cutting blade, often two cutting blades which are driven in opposite directions, wherein the cutting blades have cutting teeth arranged on at least one side of the cutting blades. The cutting blades extend along a blade axis and the cutting teeth extend along a tooth axis with the tooth axis being arranged transversely to the blade axis. In cutting mode, the blade assembly is guided in such a manner that the cut plant matter gets into the space between the cutting blades. As a result of an oscillating movement of the cutting blades, the cut plant matter is severed at the cutting edges of the cutting teeth.

In order to comply with relevant safety standards, construction types are known wherein at least a portion of the cutting teeth are configured as protective teeth. A protective tooth of this sort exhibits, relative to the blade axis, an inner cutting area which connects to an outer protective finger. The protective fingers, which are disposed at a predetermined distance from one another, prevent objects of a predetermined diameter or larger from reaching the inner cutting area. Such protective fingers can, however, also hinder objects to be cut from reaching the inner cutting region. Furthermore it can be observed that a portion of the cut plant matter reaching the cutting region is pressed out of the gutting region when the blades strike the cut matter. This leads to an incomplete severing, which lessens the cutting performance of the blade assembly.

SUMMARY OF THE INVENTION

It is an object of the invention to further develop a generic blade assembly to improve the cutting performance and cutting quality of a generic blade assembly without affecting its operational safety.

The blade assembly of the invention is for a hedge trimmer. The blade assembly defines a blade axis and includes: at least one cutting blade extending along the blade axis and having a plurality of cutting teeth; a first portion of the cutting teeth extending along respective first tooth axes lying transversely to the blade axis and a second portion of the cutting teeth extending along respective second tooth axes lying transversely to the blade axis; the first portion of cutting teeth being configured as protective teeth and each one of the protective teeth having an inner cutting region referred to the blade axis; the protective tooth having a protective finger extending from the inner cutting region; the protective tooth being unsymmetrical with respect to the first tooth axis corresponding thereto and having a cutting side and a holding side lying opposite to the cutting side; the protective tooth having a cutting edge on the cutting side in the cutting region and having a holding edge on the opposite-lying holding side; the protective finger having a forward edge on the cutting side and a rearward edge on the holding side; and, the forward edge, proceeding from the blade axis, being inclined toward the corresponding first tooth axis and the rearward edge, proceeding from the blade axis, being inclined away from the corresponding first tooth axis.

A blade assembly is provided wherein the protective tooth is, relative to the tooth axis, asymmetrically configured with a cutting side and a holding side arranged opposite to the cutting side. The protective tooth has a cutting edge on the cutting side in the cutting region and a holding edge on the holding side. The protective finger exhibits a front edge on the cutting side and a back edge on the holding side. The front edge of the protective finger leans toward the tooth axis relative to the blade axis and the back edge of the protective finger leans away from the tooth axis relative to the blade axis. The front edge of the protective finger, which leans toward the blade axis, facilitates the introduction of plant matter to be cut from outside the cutting region into the cutting region. The back edge, which leans away from the tooth axis, functions similar to a barb outside the cutting area and prevents previously introduced cut plant matter from being pressed out of the cutting region during the cutting procedure. This effect is further increased in that the holding edge on the holding side of the cutting region is not equipped as a cutting edge. Rather a cutting edge from the oppositely running tooth meets the comparatively blunt holding edge. The interaction of the cutting edge and the holding edge leads to a good cutting performance and cutting quality with the tendency of cut plant matter being pressed out of the cutting region being decreased. The required engine output is decreased. In particular, with an optional embodiment of the hedge trimmer with a battery powered electric motor this leads to a longer battery life and therefore an improved cutting result within the period of operation of a single battery charge.

In a preferred embodiment, the front edge of the protective finger has a first angle of inclination and the back edge has a second angle of inclination with the value of the first angle of inclination being smaller than the value of the second angle of inclination. This results in the distance between two neighboring protective fingers being a smallest value starting from which the gap gets larger toward the inside toward the cutting region. The aforementioned minimum distance between two neighboring protective fingers defines the desired protective function, in that only the plant matter to be cut with a diameter smaller than this minimal distance can be inserted. As soon as the cut plant matter has passed through the area of the minimal distance toward the inside to the cutting region, the increasing distance enables a free movability of the cut plant matter which facilitates its entry into the cutting region. In the opposing direction, starting from the cutting region outwardly, the distance between the neighboring protective fingers decreases, which hinders cut material from being pushed out of the cutting area.

To achieve the aforementioned effect, it has been determined to be advantageous for the first angle of inclination to be in the range of inclusively 5° up to and including 15°, and preferably about 10°, and the second angle of inclination to be in the range of inclusively 20° up to and including 40° and preferably about 30°.

In a preferred embodiment, the holding edge lying on the inner side of the protective finger in the cutting region leans toward the tooth axis starting from the blade axis. In connection with the adjacent holding edge of the protective finger, which leans in the opposing direction, a continuous concavely curved edge is formed, which supports the holding function of the plant matter to be cut in the cutting region.

In a preferred embodiment, a cutting edge running opposite to the holding edge has a third angle which leans toward the tooth axis starting from the blade axis. This third angle of inclination is preferably in the range of inclusively 5° up to and including 15° and particularly about 10°. The holding edge and the oppositely running cutting edge define a V-shaped cutting zone in the cutting region which widens toward the outside whereby an optimal cutting performance and quality is achieved. The value of the third angle of inclination, however, smaller or equal to the value of the second angle of inclination. Thus, the back edge of the protective finger and the extension of the oppositely running cutting edge run toward each other in the direction away from the blade axis. Consequently the plant matter to be cut can not or only in a limited manner slide out along the cutting edge.

In a preferred embodiment, a sharpened or ground region is provided on the cutting side in the cutting region, which is bounded by the cutting edge on one end and by a ground edge on the opposite-lying end. The front edge of the protective finger is set back in the direction of the back edge compared to the sharpened edge. Alternatively or in combination herewith, it can be advantageous that the sharpening edge has a fourth angle of inclination which leans toward the tooth axis starting from the blade axis with the fourth angle of inclination being smaller than the first angle of inclination of the front edge of the protective finger. In this way, the cutting edge or cutting edge region can be sharpened or resharpened without the sharpening tool coming into contact with the protective finger. The protective finger retains its intended blunt configuration which augments the protective properties.

In a preferred embodiment, at least on one side of the blade axis, at least two mutually adjacent and especially all cutting teeth are configured as protective teeth. Preferably, two specially like cutting blades are provided for which, on one side of the blade axis, the cutting teeth are configured as protective teeth and for which, on the opposite-lying side of the blade axis, the cutting teeth are configured without a protective finger. The two cutting blades, referred to the blade axis, are arranged rotated by 180° and are driven in mutual opposition. Accordingly, only one side of the individual cutting blade is provided with protective fingers which reduces the moved mass. Nonetheless, with the mutually rotated arrangement of the two cutting blades, both sides of the blade assembly are protected by protective fingers. The protective action and simultaneously improved cutting capacity and cutting quality take place at both sides over the total longitudinal extension of the blade assembly.

The cutting angle of the cutting edges advantageously lies in a range from 25° to 45° inclusive and is especially approximately 35°. The holding edge of the cutting teeth has an edge angle which preferably lies in a range from 80° to 100° inclusive and is especially approximately 90°. An acute angled cutting edge meets up with a holding edge having an obtuse angle compared thereto. An optimum cutting capacity and cutting quality are found within the above-mentioned angular ranges.

BRIEF DESCRIPTION OF THE DRAWINGS

The invention will now be described with reference to the drawings wherein:

FIG. 2 is a plan view of one of the individual cutting blades of FIG. 1 with details with respect to arranging different cutting teeth of both sides of the blade axis;

FIG. 3 is an enlarged detail view of individual cutting teeth of FIG. 1 which are shown in interaction with a further cutting tooth not having a protective finger as well as details with respect to the geometric configuration of the teeth; and, FIG. 4 is a transverse section of the cutting tooth of FIG. 3 taken along line IV-IV of FIG. 3 showing details as to the cutting angle and the opposite-lying edge angle.

DESCRIPTION OF THE PREFERRED EMBODIMENTS OF THE INVENTION

Figure 1:
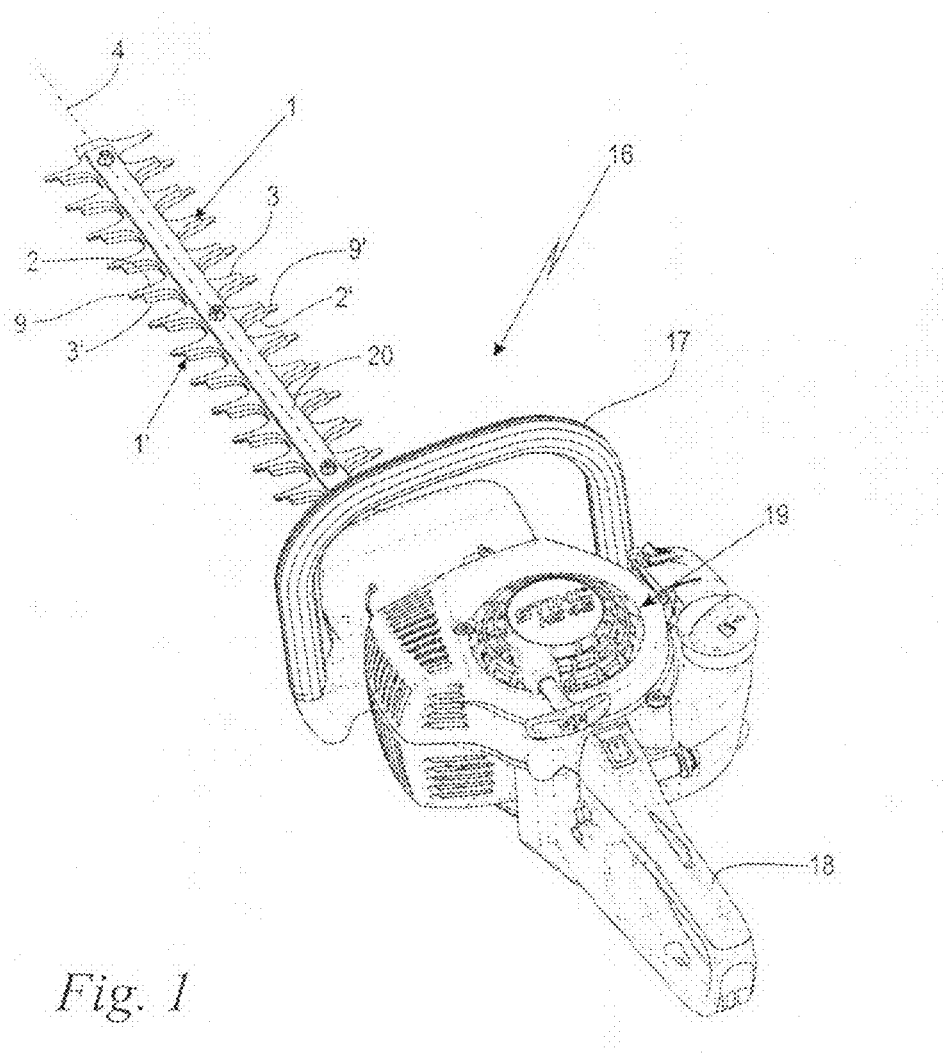
FIG. 1 is a perspective view of a hedge trimmer having the blade assembly according to the invention which provides for two cutting blades running in mutually opposite directions.

FIG. 1 shows, in a perspective view, a hedge trimmer 16 having a motor housing 19. A forward handle 17 and a rearward handle 18 are arranged on the motor housing 19 whereat the hedge trimmer 16 is held and guided by the user. On the side of the forward handle 17, a blade assembly configured in accordance with the invention extends from the motor housing 19. The blade assembly includes a cutting blade beam 20 having two cutting blades (1, 1'). The blade beam 20 is fixedly connected to the motor housing 19.

The two cutting blades (1, 1') are guided on the blade beam 20 so as to move oscillatingly in the direction of the longitudinal axis thereof and are driven to oscillate in mutually opposite directions by a drive motor (not shown) mounted in the motor housing 19. The drive motor can be an electric motor for the power mains or can be driven by batteries and, in the embodiment shown, the drive motor is configured as an internal combustion engine, especially in a single cylinder, two-stroke configuration.

The two cutting blades (1, 1') each extend along the blade axis 4 which lies parallel to the longitudinal axis of the blade beam 20. The cutting blades (1, 1') have cutting teeth (2, 2'; 3, 3') on both sides of the blade axis 4. Details with respect to the cutting teeth are shown in the plan view of one of the individual cutting blades 1 in FIG. 2. As shown in FIG. 2, cutting teeth 2 are arranged on one side of the blade axis 4 and cutting teeth 3 are arranged on the opposite-lying side of the blade axis 4. All cutting teeth 2 on the one side of the blade axis 4 are configured as protective teeth 7 having an inner cutting region 8 referred to the blade axis 4 and with a protective finger 9 extending therefrom outwardly. The opposite-lying cutting teeth 3 have only the cutting region 8 without a protective finger 9 extending therefrom. The cutting teeth (2, 3) are, however, configured the same with respect to each other in the features of the cutting region 8 described in greater detail hereinafter.

It can be practical not to configure all cutting teeth 2 on one side of the blade axis 4 as protective teeth 7. However, at least two mutually adjacent cutting teeth 2 are each configured as a protective tooth 7. Furthermore, it can be practical to configure individual or all opposite-lying cutting teeth 3 as protective teeth 7 in the same manner as the cutting teeth 2. The additional cutting blade 1' of FIG. 1 is at least in the region of its cutting teeth (2', 3') configured to be the same as cutting blade 1 with its cutting teeth (2, 3).

Considering FIGS. 1 and 2 together, it can be seen that the two cutting blades (1, 1') are arranged rotated with respect to each other by 180° and lie in surface-to-surface contact with each other. During their oscillating mutually opposite-running movement, the cutting teeth 2 of the upper cutting blade 1 coact with the cutting teeth 3' of the lower cutting blade 1' on one side of the blade axis 4; whereas, on the opposite-lying side of the blade axis 4, the cutting teeth 3 of the upper cutting blade 1 coact with the cutting teeth 2' of the lower cutting blade 1'. Here, the protective fingers 9 of the upper cutting blade 1 lie on one side of the measuring axis 4 while the protective fingers 9' of the lower cutting blade 1' are arranged on the opposite-lying side. The cutting regions 8 (FIG. 2) of all cutting teeth (2, 2'; 3, 3') are thereby protected outwardly by the protective fingers (9, 9').

FIG. 3, in an enlarged detail view, shows the region of two cutting teeth 2 of the cutting blade 1, which are configured as protective fingers 9, coacting with an individual cutting tooth 3' of the cutting blade 1'. The cutting teeth (2, 3') each extend along a tooth axis (5, 6) lying transversely or at right angles to the blade axis 4. In the plan view pregiven by the tooth axis 5 and the blade axis 4 and shown here, the cutting tooth 2, which is configured as protective tooth 7, is configured to be unsymmetrical with respect to its tooth axis 5. The protective tooth 7 has a cutting side 10 and an opposite-lying holding side 11 referred to the tooth axis 5. On the cutting side 10, the protective tooth 7 is provided with a cutting edge 12 in the cutting region 8. Likewise in the cutting region 8, a holding edge 13 is provided on the holding side 11 lying opposite to the cutting edge 12. Starting from a base body 21 of the cutting blade 1, the cutting edge 12 and the holding edge 13 extend along the entire cutting region 8 and end at the protective finger 9.

On the cutting side 10, the protective finger 9 has a forward edge 14 and, on the opposite-lying holding side 11, the protective finger has a rearward edge 15. The forward edge 14 borders in a stepped manner on the cutting edge 12 while the rearward edge 15 is curved and extends flush into the holding edge 13. The holding edge 13 extends inwardly from the rearward edge 15 and starting from the blade axis 4, the holding edge 13 is inclined to the tooth axis 5. From this, there results a concave course of the continuous edge formed by the holding edge 13 and the rearward edge 15.

In the cutting blade plane shown here, the forward edge 14 of the protective finger 9 is inclined toward the tooth axis 5 at a first inclination angle $\alpha$ starting from the blade axis 4 while the rearward edge 15 is inclined at a second inclination angle starting from the blade axis 4 and away from the tooth axis 5. The magnitude of the first inclination angle $\alpha$ is less than the magnitude of the second inclination angle $\beta$. The first inclination angle $\alpha$ advantageously lies in a range of $5° \leq \alpha \leq 15°$ and, in the embodiment shown, is approximately 10°. The second inclination angle $\beta$ preferably lies in a range of $20° \leq \beta \leq 40°$ and amounts to approximately 30° in the embodiment shown. The mutually adjacent forward and rearward edges (14, 15) of two mutually adjacent protective fingers 9 delimit together with respective corresponding cutting edge 12 and holding edge 13 an intermediate space 23 which is stroked over by the cutting tooth 3'. The mutually adjacent forward and rearward edges (14, 15) of mutually adjacent protective fingers 9 do not lie parallel to each other; rather, these widen in a V-shape inwardly to the cutting region 8. In the opposite direction, that is, outwardly from the cutting region 8, the forward and rearward edges run toward each other so that they hinder intermediate-lying cut matter from being pressed outwardly from the cutting region 8 and outwardly from the intermediate space 23.

In the cutting region 8, a ground region 24 is provided on the cutting side 10. Referred to the blade axis 4, the ground region 24 is delimited on one side by the cutting edge 12 and, on the opposite-lying side, by a ground edge 25. In cross section corresponding to FIG. 4, the ground region 24 is beveled to form a sharp edge starting, from the ground edge 25 and extending toward the cutting edge 12. The cutting tooth 2 has essentially a constant thickness outside of the ground region 24. The forward edge 14 of the protective finger 9 is set back relative to the ground edge 25 in the direction of the rearward edge 15 by an amount $\Delta$. Furthermore, the ground edge 25 is inclined toward the tooth axis 5 at a fourth inclination angle $\phi$ starting from the blade axis 4.

The fourth inclination angle $\phi$ is slightly smaller than the first inclination angle $\alpha$ of the forward edge 14. With this measure, the situation is achieved that, when grinding the ground region 24, that is, when sharpening the cutting edge 12, the grinding tool does not come in contact with the bordering forward edge 14 of the protective finger 9.

During operation, the cutting tooth 3' runs toward the cutting tooth 2, which is configured as protective tooth 7, in a relative movement along the blade axis 4. The cutting edge 12' of the cutting tooth 3 meets up with the holding edge 13 of the cutting tooth 2. The cutting edge 12' of the cutting tooth 3' is likewise inclined as the cutting edge 12 of the cutting tooth 2 at a third inclination angle $\gamma$ to the tooth axis 6. The third inclination angle $\gamma$ advantageously lies in the range of $5° \leq \gamma \leq 15°$ and, in the embodiment shown, is approximately 10°. The magnitude of the third inclination angle $\gamma$ is thereby less than the magnitude of the second inclination angle $\beta$. It can, however, be practical that the magnitude of the third inclination angle $\gamma$ is equal to the magnitude of the second inclination angle $\beta$. For the interaction of the holding edge 13 with the toward-running cutting edge 12', the same therefore applies as described in connection with the two mutually adjacent forward and rearward edges (14, 15) of two mutually adjacent protective fingers 9, namely: the rearward edge 15 and the holding edge 13 of the protective tooth 7 conjointly with the toward-running cutting edge 12' of the cutting tooth 3' delimit a cutting space 22. The rearward edge 15 and the extension of the cutting edge 12' run away from the blade axis 4 toward each other to form a V-shape whereby the cutting space 22 is narrowed outwardly. In this way, the rearward edge 15, the holding edge and the toward-running cutting edge 12' hinder the cut matter from slipping out in the outward direction from the cutting space 22 covered by the cutting region 8 between the holding edge 13 and the cutting edge 12'. The description above applies in the same manner to the interaction of cutting teeth (2', 3) (FIG. 1).

FIG. 4 shows a cross section of the cutting tooth 2 of FIGS. 1 to 3 in its cutting region 8. The cutting edge 12 has a cutting angle $\delta$ which preferably lies in the range $25° \leq \delta \leq 45°$ and is approximately 35° in the embodiment shown. The opposite-lying holding edge 13 lies in the same surface side as the cutting edge 12 and has an edge angle $\epsilon$ which preferably lies in the range of $80° \leq \epsilon \leq 100°$ and is 90° in the embodiment shown. The cutting teeth 3 (FIG. 2) are configured the same way in their cutting region 8.

Viewing FIGS. 1 to 4 together, it can be seen that in the oscillating relative movement of the two cutting blades (1, 1'), a cutting edge 12 of the cutting teeth (2, 2') always meets a holding edge 13' with the edge angle $\epsilon$ of the assigned cutting tooth (3, 3') while, on the other hand, the cutting edges 12' of the cutting teeth (3, 3') meet up with the holding edges 13 of the cutting teeth (2, 2') configured as protective teeth 7. The interaction of each cutting edge (12, 12') with a corresponding holding edge (13, 13') leads, in the above embodiment, to an improved cutting result which is supported by the above-described holdback action of the protective fingers 9 in the manner of the invention.

It is understood that the foregoing description is that of the preferred embodiments of the invention and that various changes and modifications may be made thereto without departing from the spirit and scope of the invention as defined in the appended claims.

What is claimed is:

1. A blade assembly of a hedge trimmer, the blade assembly defining a blade axis and comprising:

at least one cutting blade having a base body and extending along said blade axis and having a plurality of cutting teeth;

a first portion of said cutting teeth extending along respective first tooth axes starting from said base body and lying transversely to said blade axis and a second portion of said cutting teeth extending along respective second tooth axes lying transversely to said blade axis;

said first portion of cutting teeth being configured as protective teeth and each protective tooth of said protective teeth having an inner cutting region extending from said blade axis;

said inner cutting region defining a cutting edge having an outer end;

said inner cutting region extending from said base body outwardly up to said outer end of said cutting edge whereat said inner cutting region ends;

said protective tooth having a protective finger extending from said inner cutting region;

said protective tooth being unsymmetrical in said cutting region with respect to the first tooth axis corresponding thereto and having a cutting side and a holding side lying opposite to said cutting side;

said protective tooth having the cutting edge on said cutting side in said cutting region and having a blunt holding edge on the opposite-lying holding side in said cutting region;

said protective finger having a forward edge on said cutting side and a rearward edge on said holding side;

said cutting edge having a cutting angle ($\delta$) in said cutting region lying in a range of 25° to 45' (25'≤$\delta$≤45°);

said holding edge having an edge angle ($\epsilon$) in said cutting region lying in a range of 80° to 100° (80°≤$\epsilon$≤100°); and, said forward edge of said protective finger extending from said outer end of said cutting edge and being rearwardly inclined at a first angle ($\alpha$) of inclination with respect to said first tooth axis and said rearward edge of said protective finger extending rearwardly from said holding edge at a second angle ($\beta$) of inclination with respect to said first tooth axis.

2. The blade assembly of claim 1, wherein the magnitude of said first angle ($\alpha$) is less than the magnitude of said second angle ($\beta$).

3. The blade assembly of claim 2, wherein the magnitude of said first angle lies in a range of 5°≤$\alpha$≤15° and the magnitude of said second angle lies in a range of 20°≤$\beta$≤40°.

4. The blade assembly of claim 3, wherein said magnitude of said first angle ($\alpha$) is 10°.

5. The blade assembly of claim 3, wherein said magnitude of said second angle ($\beta$) is 30°.

6. The blade assembly of claim 2, wherein each one of the cutting teeth of said second portion of said cutting teeth has a cutting edge inclined at a third angle ($\gamma$) of inclination to the second tooth axis corresponding thereto proceeding from said blade axis and measured in a region forward of said second tooth axis; and, said third angle ($\gamma$) has a magnitude equal to or less than said second angle ($\beta$).

7. The blade assembly of claim 6, wherein said third angle ($\gamma$) lies in a range of 5°≤$\gamma$≤15°.

8. The blade assembly of claim 7, wherein said third angle ($\gamma$) is 10°.

9. The blade assembly of claim 2, wherein said cutting region has a ground region on the cutting side; said ground region is delimited by a ground edge at one end thereof; said ground edge, proceeding from said blade axis and measured in a region forward of said first tooth axis, is inclined at a fourth angle ($\phi$) of inclination to the first tooth axis corresponding to said tooth; and, said fourth angle is less than said first angle ($\alpha$) of the forward edge.

10. The blade assembly of claim 1, wherein said holding edge is inclined toward said first tooth axis proceeding from said blade axis and measured in a region rearward of said first tooth axis.

11. The blade assembly of claim 1, wherein said cutting region has a ground region therein on the cutting side; said ground region is delimited by the cutting edge on one end thereof and by a ground edge on the opposite lying end thereof; and, said forward edge of said protective finger is offset rearwardly relative to said ground edge in the direction toward said rearward edge of said protective finger.

12. The blade assembly of claim 1, wherein, at least on one side of said blade axis, at least two mutually adjacent cutting teeth are configured as protective teeth.

13. The blade assembly of claim 12, wherein all of the cutting teeth on said one side of said blade axis are configured as protective teeth.

14. The blade assembly of claim 1, wherein said at least one cutting blade is a first cutting blade and said blade assembly further comprises:

a second cutting blade likewise extending along said blade axis and having a plurality of cutting teeth;

all of the cutting teeth of each of said cutting blades to one side of said blade axis being configured as said protective teeth and all of the cutting teeth on the other side of said blade axis are configured as cutting teeth without said protective finger; and, said first and second cutting blades being rotated by 180° with respect to each other extending from said blade axis and being driven in mutually opposite directions along said blade axis.

15. The blade assembly of claim 14, wherein each of said cutting blades are the same.

16. The blade assembly of claim 1, wherein said cutting angle ($\delta$) is 35°.

17. The blade assembly of claim 1, wherein said edge angle ($\epsilon$) is 90°.

18. The blade assembly of claim 1, wherein said cutting edge and said holding edge starting from said base body extend along all of said inner cutting region up to said protective finger whereat said cutting edge and said holding edge end.

* * * * *